(12) United States Patent
Sivertsen

(10) Patent No.: US 8,284,552 B2
(45) Date of Patent: Oct. 9, 2012

(54) COMPUTER SYSTEM EXPANSION DEVICE ADAPTABLE FOR INTERNAL AND EXTERNAL USE

(75) Inventor: Clas Gerhard Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 109 days.

(21) Appl. No.: 12/904,808

(22) Filed: Oct. 14, 2010

(65) Prior Publication Data

US 2011/0026217 A1 Feb. 3, 2011

Related U.S. Application Data

(63) Continuation of application No. 12/496,722, filed on Jul. 2, 2009, now Pat. No. 7,839,628, which is a continuation of application No. 11/478,100, filed on Jun. 29, 2006, now Pat. No. 7,567,434.

(51) Int. Cl.
*H05K 5/00* (2006.01)
(52) U.S. Cl. ............................ 361/679.32; 361/679.41
(58) Field of Classification Search ............ 361/679.32, 361/679.41
See application file for complete search history.

(56) References Cited

U.S. PATENT DOCUMENTS

| 5,162,675 | A | * | 11/1992 | Olsen et al. ..................... 326/37 |
| 6,146,150 | A | | 11/2000 | Roberts |
| 6,421,215 | B1 | * | 7/2002 | Bushue ........................ 361/93.1 |
| 6,840,801 | B1 | * | 1/2005 | Behl ........................... 439/541.5 |
| 6,983,340 | B1 | * | 1/2006 | Hermanson et al. .......... 710/301 |
| 2002/0044420 | A1 | | 4/2002 | Chen |

* cited by examiner

*Primary Examiner* — Anthony Haughton
(74) *Attorney, Agent, or Firm* — Morris Manning & Martin, LLP; Tim Tingkang Xia, Esq.

(57) ABSTRACT

Systems and apparatus for providing supplemental functionality to a computer system with an expansion card adaptable for both internal and external coupling to the computer system. An expansion card has a bracket for internally coupling to a host computer and a housing for external coupling to a host computer. The expansion card may receive power from the host computer via an edge connector when internally coupled and through a power adapter via a power port when externally coupled. The expansion card may further receive data from the host computer via the edge connector when internally coupled and through an external bus when externally coupled. When externally coupled, the expansion card is mounted within a housing that may be mounted to an outside surface of a computer rack to preserve space within the rack.

16 Claims, 11 Drawing Sheets

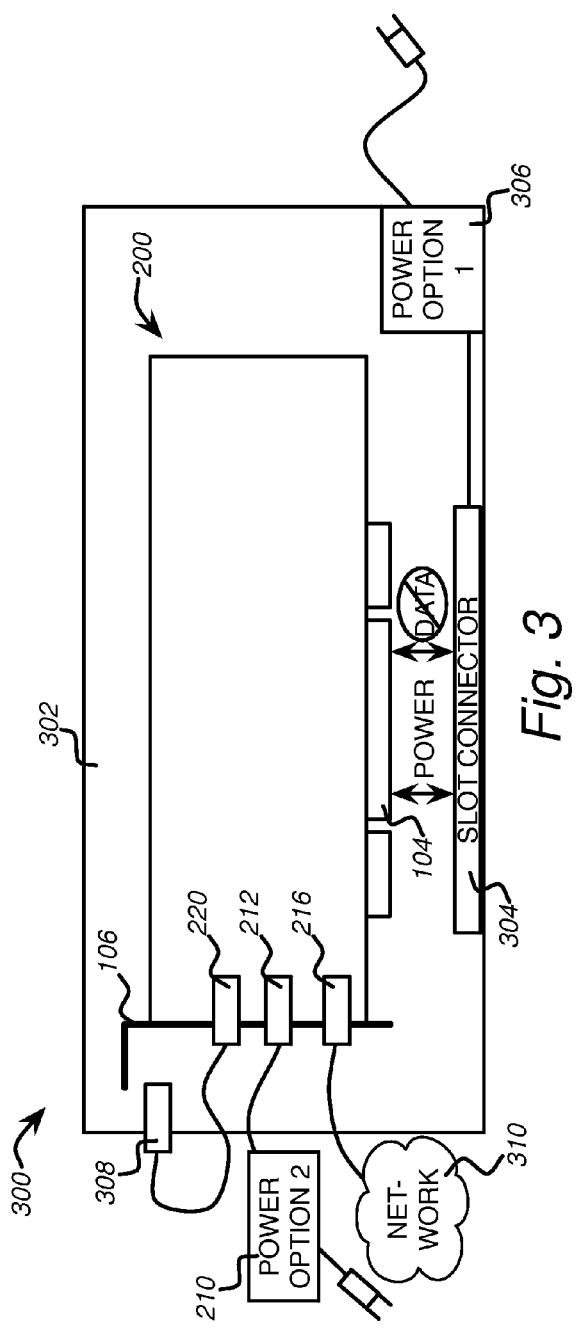
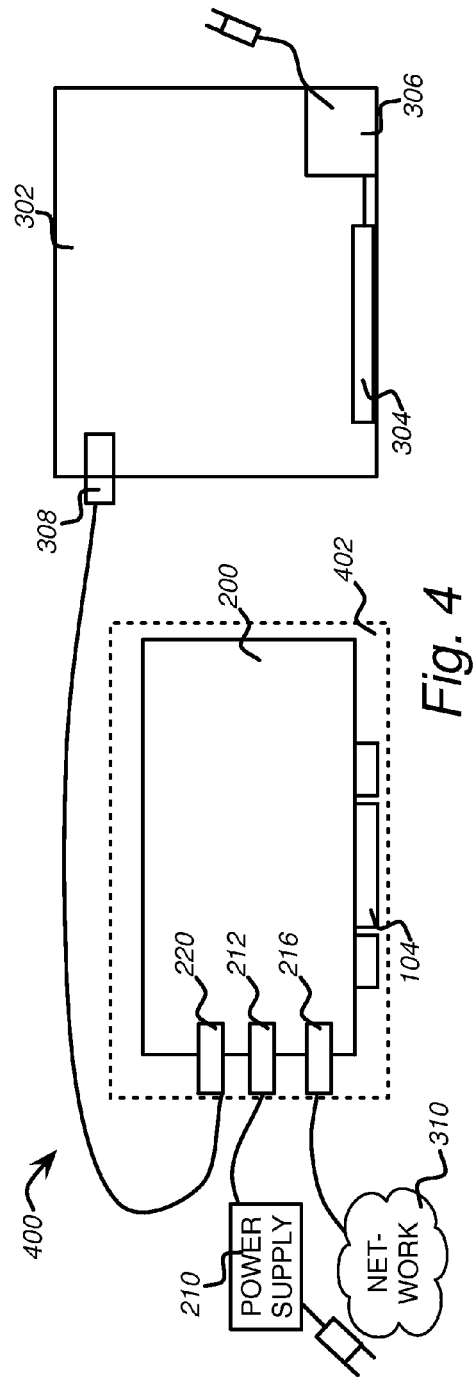
Fig. 3
Fig. 4

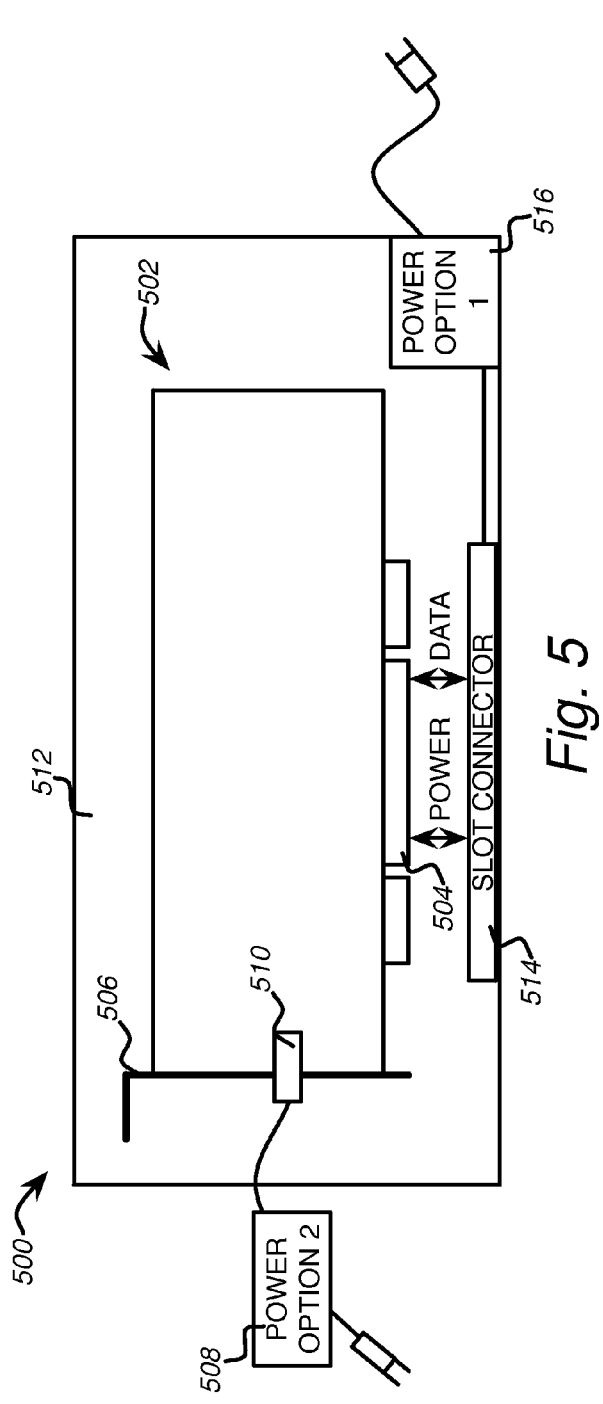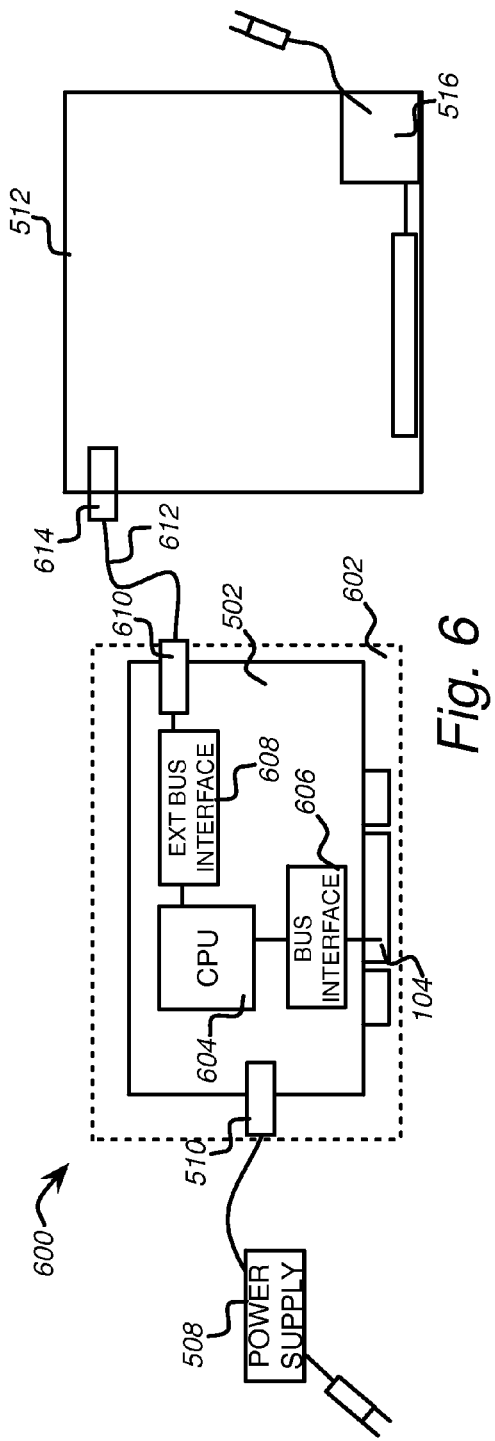

COMPUTER SYSTEM EXPANSION DEVICE ADAPTABLE FOR INTERNAL AND EXTERNAL USE

CROSS-REFERENCE TO RELATED APPLICATIONS

This application is a continuation of, and claims benefit of U.S. patent application Ser. No. 12/496,722, filed Jul. 2, 2009 now U.S. Pat. No. 7,839,628, entitled "Computer System and Expansion Device Adaptable for Internal and External Use" by Clas Gerhard Sivertsen, now issued U.S. Pat. No. 7,839, 628, the disclosure for which is herein incorporated by reference in its entirety. U.S. patent application Ser. No. 12/496, 722 is itself a continuation of U.S. patent application Ser. No. 11/478,100, entitled "Computer System Expansion Device Adaptable for Internal and External Use," filed Jun. 29, 2006, which status is issued as U.S. Pat. No. 7,567,434, the disclosure for which is herein incorporated by reference in its entirety.

BACKGROUND

Computer systems may be upgraded with supplemental functionality using various procedures. One approach for upgrading a computer system is to install an internal expansion card within the host computer. Expansion cards are printed circuit boards that are plugged into an expansion slot of the host computer in order to add a desired set of functions to the computer. An expansion card typically has an edge connector that plugs into a corresponding expansion slot connector of the host computer. The edge connector of the expansion card has contacts that establish electrical contact with one or more components on the motherboard of the host computer via an internal bus when inserted into an expansion slot connector of the host computer. A bracket connected to one edge of the expansion card secures the card to the host computer while allowing access to any number of ports on the expansion card for connection to external peripheral devices.

Another approach for providing supplemental functionality to a computer system is to connect an external device to the host computer. For instance, an external bus may be used to transfer data between the external device and the host computer. Many devices that may be added to a host computer to provide additional functionality to the computer system are manufactured in two different form factors, as an expansion card and as an external device. Examples include modems, Universal Serial Bus ("USB") hubs and other input/output hubs, and remote computer monitoring devices. There are advantages and disadvantages to utilizing internal expansion cards versus external devices to achieve the same functionality in a computer system.

Internal expansion cards are desirable in that they do not increase the footprint of the computer system in which it is installed. Additionally, the edge connector of an internal expansion card allows the card to receive power directly from the host computer and allows for rapid data transfer speeds. However, there are often a limited number of expansion slots available in a host computer. Peripheral devices also have advantages and disadvantages over expansion cards. Peripheral devices allow for simplified installation and portability, but they increase the footprint of the host computer, often require an external power supply, and may be subject to more limited data transfer speeds when compared to an internal expansion card due to the limitations of an external bus. As a result of the demand for both internal and external versions of the same product, manufacturers are burdened with the increased expense associated with producing two functionally identical products instead of one.

It is with respect to these considerations and others that the various embodiments of the invention have been made.

SUMMARY

In accordance with present embodiments described herein, the above and other problems are solved by apparatus and systems for providing additional functionality to a computer system using an expansion device in either an internal or an external configuration. Through the embodiments, a bracket is provided and the expansion card receives power and/or data via an edge connector when internally coupled to the computer system. However, when the expansion card is externally coupled to the computer system, a housing is provided and the expansion card receives power and/or data via an external interface.

According to one implementation described herein, an apparatus provides supplemental functionality to a computer system when internally coupled to the computer system and when externally coupled to the computer system. The apparatus includes an expansion card that has an edge connector for receiving power when the expansion card is internally coupled to the computer system. The expansion card also has a power port for receiving power when externally coupled to the computer system. The apparatus further includes a housing that receives the expansion card when externally coupled to the computer system.

According to further embodiments described herein, the housing has a case and a bottom plate. The case includes opposing vertical walls and a top horizontal surface that adjoins the vertical walls. The bottom plate is also adjacent to the vertical walls and opposite the top horizontal surface when assembled such that the expansion card is disposed in the space created between the case and bottom plate. The apparatus may additionally have a removable bracket for securing the expansion card to the computer system when the card is internally coupled to the computer system.

According to another implementation, an apparatus that provides supplemental functionality to a computer system includes an expansion card that has one data interface for receiving data from the computer system when the card is internally coupled and another data interface for receiving data from the computer system when the card is externally coupled. The apparatus may further include an expansion card edge connector for receiving power when the card is internally coupled to the computer system and a power port for receiving power when the expansion card is externally coupled to the computer system. A housing may be provided to receive the expansion card when externally coupled to the computer system.

Yet another implementation includes a system for providing supplemental functionality to a computer system with an expansion card when internally coupled to the computer system and when externally coupled to the computer system. The system includes an expansion card with an edge connector for receiving power when the card is internally coupled to the computer system and a power port for receiving power when the card is externally coupled to the computer system. A power supply provides power to the power port when the expansion card is externally coupled to the computer system. A mounting is provided to secure the expansion card to the computer system when the card is internally coupled to the computer system. A housing is provided to receive the expansion card when the card is externally coupled to the computer system. The housing has a case and a bottom plate. The case includes opposing vertical walls and a top horizontal surface that adjoins the vertical walls. The bottom plate is also adjacent to the vertical walls and opposite the top horizontal surface when assembled such that the expansion card is disposed in the space created between the case and bottom plate.

These and various other features as well as advantages, which characterize the disclosure presented herein, will be apparent from a reading of the following detailed description and a review of the associated drawings.

DESCRIPTION OF THE DRAWINGS

FIG. 3 is a block diagram illustrating an expansion card internally coupled to a computer system and having two options for receiving power according to one embodiment described herein;

FIG. 4 is a block diagram illustrating an expansion card externally coupled to a computer system according to one embodiment described herein;

FIG. 5 is a block diagram illustrating an expansion card internally coupled to a computer system and receiving power and data from the computer system via an edge connector of the expansion card according to one embodiment described herein;

FIG. 6 is a block diagram illustrating an expansion card externally coupled to a computer system and having separate data bus interfaces for internal and external couplings to the computer system according to one embodiment described herein;

DETAILED DESCRIPTION

Embodiments described herein provide apparatus and systems for providing supplemental functionality to a computer system with an expansion card adaptable for both internal and external coupling to the computer system. In the following detailed description, references are made to the accompanying drawings that form a part hereof, and in which are shown by way of illustration specific embodiments or examples.

Figure 1:
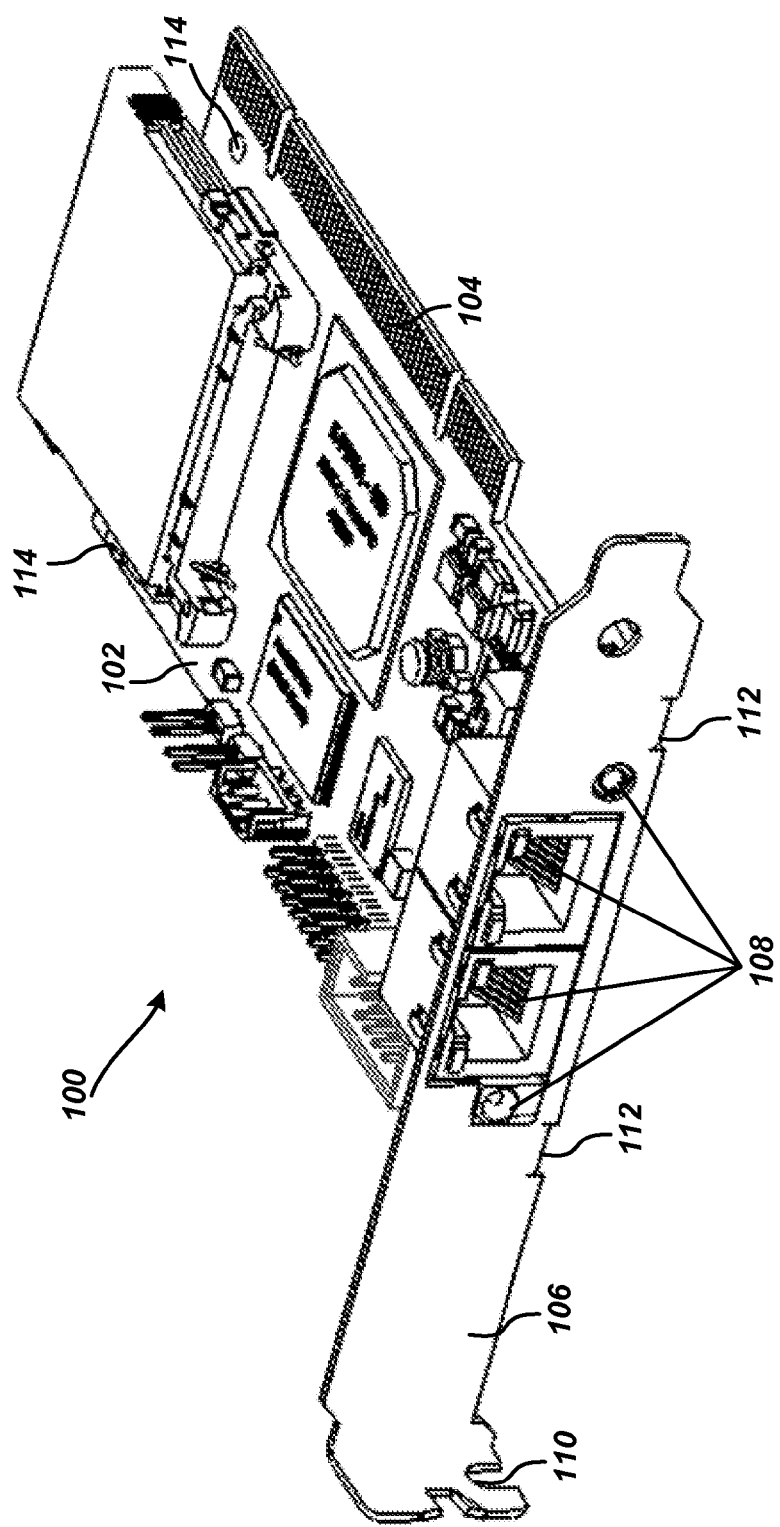
FIG. 1 is a perspective view of an expansion card configured for internal coupling to the computer system showing a mounting bracket and an edge connector according to one embodiment described herein.

As mentioned above, expansion cards are printed circuit boards that are plugged into an expansion slot of the host computer in order to add a desired set of functions to the computer. Referring now to the drawings, in which like numerals represent like elements throughout the several figures, the exemplary operating environment and several illustrative implementations will be described. FIG. 1 shows an expansion card 100 according to one implementation described herein. The expansion card 100 includes a circuit board 102, an edge connector 104, and a mounting bracket 106. The circuit board 102 includes the chipsets and various components required to effectuate the functionality of the expansion card 100. Included along one edge of the circuit board 102 is the edge connector 104 that plugs into an expansion slot connector of the host computer. The edge connector 104 of the expansion card 100 has contacts that establish electrical contact with one or more components on the motherboard of the host computer via an internal bus when inserted into an expansion slot connector of the host computer. It should be appreciated that the expansion slot connector of the host computer may be any expansion bus connector, including but not limited to Peripheral Component Interconnect ("PCI"), PCI-X, and PCI-Express.

The mounting bracket 106 is connected to an edge of the expansion card that is adjacent to the edge having the edge connector 104 and secures the card to the host computer while allowing access to any number of connection ports 108 on the expansion card for connection to external peripheral devices. The mounting bracket 106 is secured to the host computer using a threaded fastener in slot 110. The mounting bracket 106 may be secured to the circuit board 102 using bracket tabs 112, which extend substantially perpendicularly from one edge of the bracket towards the circuit board 102. The bracket tabs 112 include apertures for receiving a fastener. The circuit board 102 similarly includes an aperture 114 in each of the four corners of the circuit board 102 (only two shown) for securing the circuit board to a bottom plate of a housing assembly as will be discussed in detail below with respect to FIGS. 14A and 14B. The apertures 114 adjacent to one edge of the circuit board 102 align with apertures in the bracket tabs 112 and receive fasteners to secure the mounting bracket 106 to the circuit board. It should be understood that additional apertures on the circuit board 102 or other known means may be used to removably secure the mounting bracket 106 to the circuit board.

Figure 2:
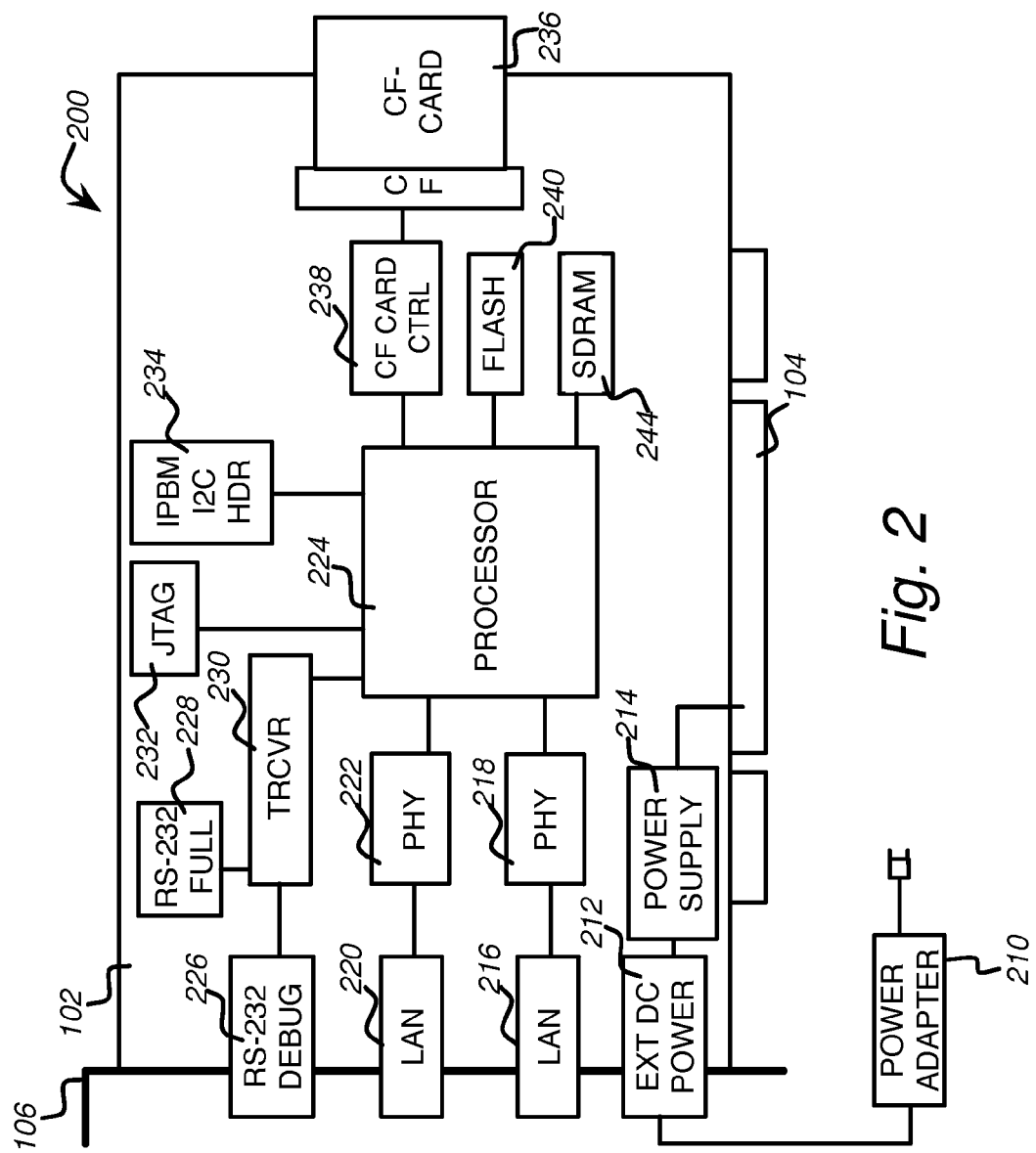
FIG. 2 is a block diagram illustrating a PC management expansion card configured to receive only power from a computer system via an edge connector of the expansion card when internally coupled to the computer system according to one embodiment described herein.

Expansion cards 100 may utilize the edge connector 104 to receive either power only from the host computer, or power and data from the host computer. The first implementation discussed herein will be expansion cards 100 that only receive power from a host computer. These cards will retain full functionality if externally coupled to the host computer as long as they receive power from an alternate source, such as a wall power adapter. An example of this type of expansion card is a PC management card 200 as shown in FIG. 2. A brief description of the PC management expansion card 200 will be given in disclosing one implementation; however, it should be understood that the disclosure presented herein is not limited to expansion cards having PC management functionality. Those with skill in the art will appreciate that the disclosure presented herein is equally applicable to expansion cards having all types of functionality.

The PC management card 200 includes a circuit board 102, an edge connector 104, and a mounting bracket 106 as described above. The PC management card 200 may receive power at the power supply 214 from the host computer via the edge connector 104 when internally coupled to the host computer or from the power adapter 210 via the power port 212. The power adapter 210 may be used as an alternative to the host computer power when the PC management card 200 is internally coupled to the host computer or in place of the host computer power when the computer power is interrupted or, as will be described below with respect to FIG. 4, when the PC management card is externally coupled to the host computer.

The PC management card 200 includes Local Area Network ("LAN") connectors 216 and 220, as well as corresponding physical layers 218 and 222, in communication with a processing device 224. The LAN connector 216 is utilized for connection to a remote computer via a network. The LAN connector 220 is for connecting the PC management card 200 to a corresponding LAN connector of the host computer. In this manner, data and management commands may be communicated between the remote computer and the host computer via the PC management card 200. Debugging, testing, and maintenance monitoring of the host computer and the PC management card 200 occur using the RS-232 components 226 and 228, the transceiver 230, as well as the JTAG and I2C components 232 and 234. The COMPACT FLASH card 236 stores various program code and instructions to be utilized by the processing device 224 via the controller 238 in interacting with the PC management components to provide the remote computer with the ability to monitor and manage certain functions of the host computer. The processing device 224 may be implemented in various ways, such as but not limited to the POWERPC 405GPr general purpose reduced instruction set processor manufactured by AMCC. The processing device 224 interacts with flash memory 240 and SDRAM 244 to perform the all necessary processing operations.

FIG. 3 illustrates an internally configured PC management solution 300. PC management solution 300 includes the expansion card 200 described above. Expansion card 200 is internally coupled to the host computer 302 via the expansion card edge connector 104 and the host computer slot connector 304. The expansion card 200 receives power from a power supply 306 of the host computer 302 via the edge connector 104. Alternatively, the expansion card 200 may receive power directly from a wall power adapter 210 via power port 212. No data is passed between the expansion card 200 and the host computer 302 via the edge connector 104. As described above, data is transmitted between the expansion card 200 and the host computer 302 via a LAN connector 220 on the expansion card and a corresponding LAN connector 308 on the host computer. A remote computer communicates with the host computer 302 over the network 310 via a LAN connector 216.

According to implementations described herein, if the host computer 302 does not have an expansion slot available, or if a user of the host computer decides that an internal expansion card is not the ideal solution, then the expansion card 200 may be configured for external coupling to the host computer. An externally configured PC management solution 400 is shown in FIG. 4. In an external configuration, the mounting bracket 106 is removed from the expansion card 200 and the card is mounted within a housing 402 for protection of the components located on the circuit board 102. The housing 402 will be described in detail below with respect to FIGS. 9-13. It should be appreciated that the housing 402 may be of sufficient size and shape to accommodate the mounting bracket 106 without requiring its removal. In the external configuration, the host computer operates as normal, communicating with the expansion card 200 via the LAN connector 308. The main distinction between the external solution 400 and the internal solution 300 shown in FIG. 3 is that the expansion card is located within the housing 402 outside of the host computer and is powered by the wall power adapter 210 rather than from the power supply 306 of the host computer via the edge connector 104.

Figure 7:
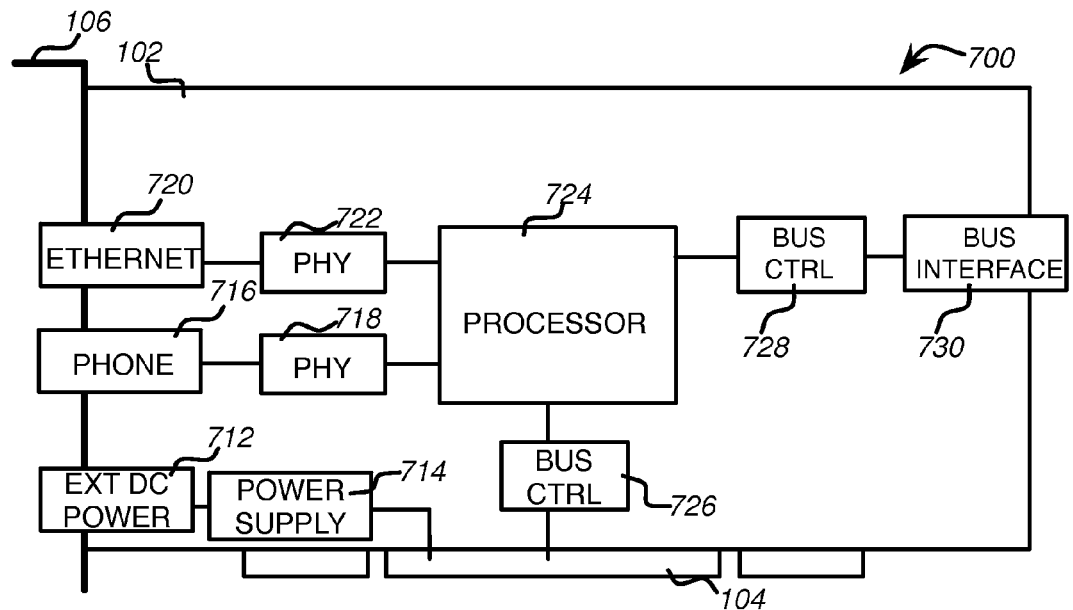
FIG. 7 is a block diagram illustrating an expansion card providing modem functionality to a computer system, the expansion card configured for internal and external coupling to the computer system according to one embodiment described herein.
Figure 8:
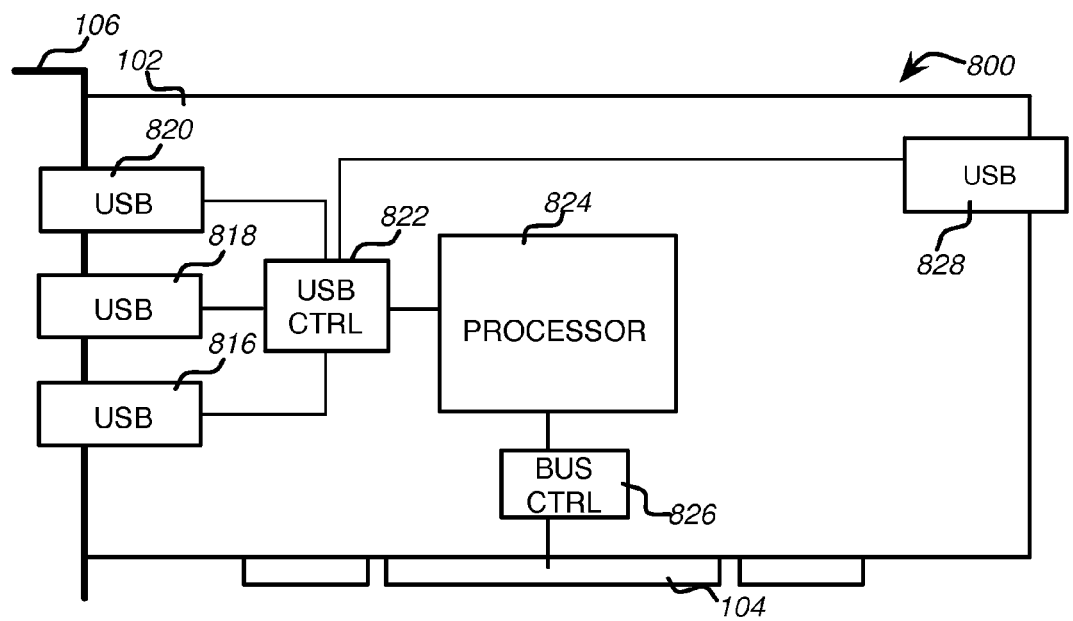
FIG. 8 is a block diagram illustrating an expansion card providing USB hub functionality to a computer system, the expansion card configured for internal and external coupling to the computer system according to one embodiment described herein.

A further implementation for adapting expansion cards for use internally or externally to a host computer regards expansion cards that receive both power and data through the edge connector 104 when internally coupled to the host computer. FIG. 5 shows an internally configured expansion card solution 500. FIGS. 5 and 6 will be described as generic expansion cards that receive both power and data via an edge connector when internally coupled to a host computer. FIGS. 7 and 8 will illustrate two implementations of these expansion cards, specifically a modem and a USB hub. Referring back to FIG. 5, the internally configured expansion card solution 500 includes the expansion card 502 internally coupled to a host computer 512. An edge connector 504 of the expansion card 502 is mated to a slot connector 514 of the host computer 512, allowing the expansion card to receive power from the power supply 516 of the host computer as well as allowing the card to receive data from the host computer. Alternatively, the expansion card 502 may receive power directly from a wall power adapter 508 via a power port 510. A mounting bracket 506 secures the expansion card 502 to the host computer 512.

According to implementations described herein, if the host computer 512 does not have an expansion slot available, or if a user of the host computer prefers a peripheral to an internal expansion card, then the expansion card 502 may be configured for external coupling to the host computer. An externally configured expansion card solution 600 is shown in FIG. 6. In an external configuration, the mounting bracket 506 is removed from the expansion card 502 and the card is mounted within a housing 602 for protection of the expansion card components. The housing 602 will be described in detail below with respect to FIGS. 9-13. Power is provided to the expansion card 502 from a wall power adapter 508 via the power port 510.

Because data is ordinarily passed to the processing device 604 of the expansion card 502 from the host computer 512 via the edge connector 504 and bus interface 606 when the expansion card is internally coupled to the host computer, an external data bus 612 is required for transferring data between the expansion card and the host computer when the expansion card is configured for external coupling. To accommodate the external bus 612, the expansion card 502 must have an external bus connector 610 and interface 608. It should be appreciated that the external bus and corresponding connectors and components may comprise USB, IEEE 1394 Firewire, Small Computer System Interface ("SCSI"), or any other external bus standards for transferring data between a host computer and a peripheral device. It should be understood that if the external bus 612 is capable of providing power to the expansion card 502, such as a USB cable, then the wall power adapter 508 is not necessary as the host computer may supply the necessary power from the power adapter 516.

FIGS. 7 and 8 show two examples of expansion cards that receive both power and data through the edge connector on the expansion card when internally coupled to the host computer and receive power and data via alternative connections when configured to be externally coupled to the host computer. FIG. 7 shows a simplified modem expansion card 700. The modem expansion card 700 includes a circuit board 102, and edge connector 104, and a mounting bracket 106. The telephone and Ethernet connectors 716 and 720 communicate with the processing device 724 via physical layers 718 and 722. The processing device 724 receives data from the host computer via the edge connector 104 and the bus controller 726. The internal modem 700 receives power at the power supply 714 via the edge connector 104 from the host computer. According to implementations described herein, the modem expansion card 700 additionally comprises an external bus interface 730 and controller 728 for transferring data between the modem expansion card and a host computer when the modem expansion card is configured as a peripheral for external connection to the host computer. The modem expansion card 700 may also comprise a power port 712 and a power supply 714 for receiving power from a wall power adapter. Alternatively, the modem expansion card 700 may receive power from the host computer via the bus interface 730 if the bus is capable of supplying power to a peripheral device.

Another implementation is shown in FIG. 8, wherein a USB hub expansion card 800 may be configured for external use. The USB hub expansion card 800 includes USB ports 816-820 in communication with a USB controller 822 and a processing device 824. Wherein peripheral USB devices connected to USB ports 816-820 communicate with the host computer via the USB controller 822, processing device 824, bus controller 826, and the edge connector 104 when the USB hub expansion card 800 is internally coupled to the host computer, the communication is routed through the processing device 824, USB controller 822, and USB interface 828 when the USB hub expansion card is externally coupled to the host computer via a USB cable. It should be noted that the USB hub expansion card 800 would not require external power as it may be powered by the host computer via the USB cable coupling the USB hub expansion card to the host computer.

Figure 9:
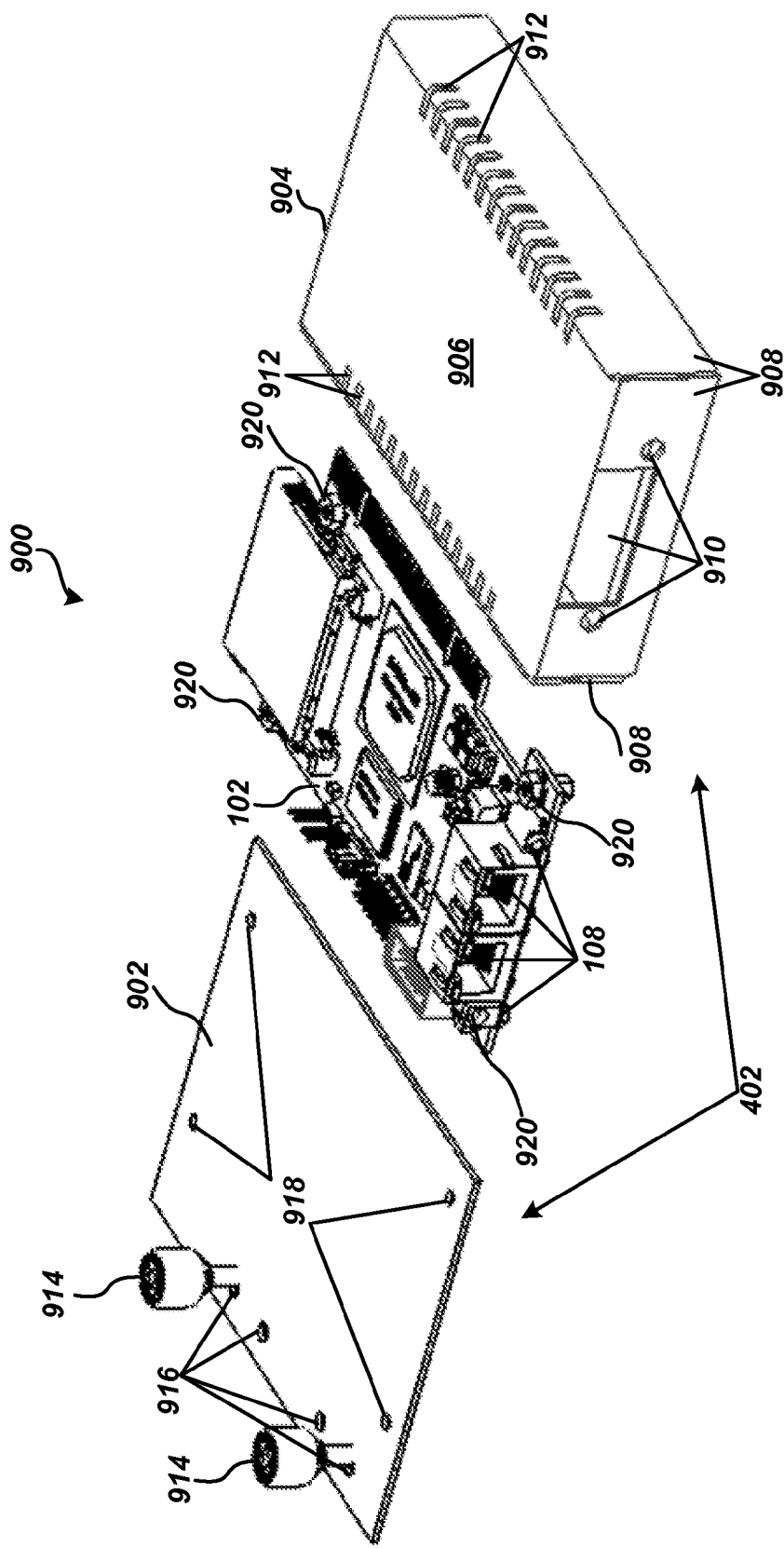
FIG. 9 is a partially exploded view of an apparatus for providing supplemental functionality to a computer system when externally coupled to the computer system showing a bottom plate, an expansion card, and a case according to one embodiment described herein.

As discussed briefly above, when an expansion card is configured for external coupling to a host computer, the mounting bracket is removed from the expansion card and the card is mounted within a housing for protection of the components located on the circuit board. For illustrative purposes, the externally configured PC management expansion card 200, as shown in the external configuration in FIG. 4, will be described with respect to FIGS. 9-13. FIG. 9 shows a partially exploded view of an externally configured PC management card, or a "peripheral expansion device" 900. The peripheral expansion device 900 comprises a circuit board 102 and a housing 402. The housing 402 is further made up of a bottom plate 902 and a case 904. The case 904 comprises a top horizontal surface 906 and vertical walls 908. At least one of the vertical walls 908 may have one or more apertures 910 for access to one or more connection ports 108 on the circuit board 102. Additional ventilation apertures 912 may be incorporated into the case 904 for controlling the temperature within the housing 402.

The circuit board 102 is secured to the bottom plate 902, which is secured to the case 904 to create the peripheral expansion device 900. One implementation for combining these components to form the peripheral expansion device 900 will be described below with respect to FIGS. 14A and 14B. It should be understood that the housing 402 may have any number of sides of any dimensions and shape as long as the circuit board 102 is at least partially disposed within a protective structure. According to one embodiment, the case 904 is stamped from a metal sheet, the vertical walls 908 are then bent 90 degrees with respect to the top horizontal surface 906 and the bottom tabs (shown in FIGS. 12 and 13) are then bent 90 degrees with respect to the vertical walls 908.

Two captive thumbscrews 914 are secured in mounting apertures 916 in the bottom plate 902. Mounting apertures 916 are configured according to a hole pattern corresponding to the dimensions of the mounting holes on a computer rack. Computing devices are secured within a rack using brackets and fasteners on the exterior surface of the rack. The holes on the exterior of the rack for receiving these fasteners are arranged according to the EIA-310 specification for a standard computer rack mounting hole pattern. Similarly, the mounting apertures 916 are also configured according to an EIA-310 specification mounting pattern. By doing so, the peripheral expansion device 900 may be secured to the exterior side of a computer rack using the captive thumbscrews 914. By securing the peripheral expansion device 900 to the exterior of the computer rack, the device does not use rack space that is often very limited and is easily accessible to a technician that is installing or removing a peripheral expansion device to one of a plurality of computer systems installed within the computer rack.

It should be understood by those with skill in the art that any means for securing the peripheral expansion device 900 to a computer rack or other structure may be used including any type and quantity of fasteners, VELCRO, tape and other adhesives, hooks, snaps, or the housing may simply be placed flat on any surface. Apertures 918 in the bottom plate 902 are configured to align with similar apertures in the circuit board 102 and in the bottom tabs of the case 904 such that mounting hardware 920 secures the bottom plate 902, circuit board 102, and case 904 together to create the peripheral expansion device 900. The mounting hardware 920 and method of assembly will be discussed below with respect to FIGS. 14A and 14B.

Figure 10:
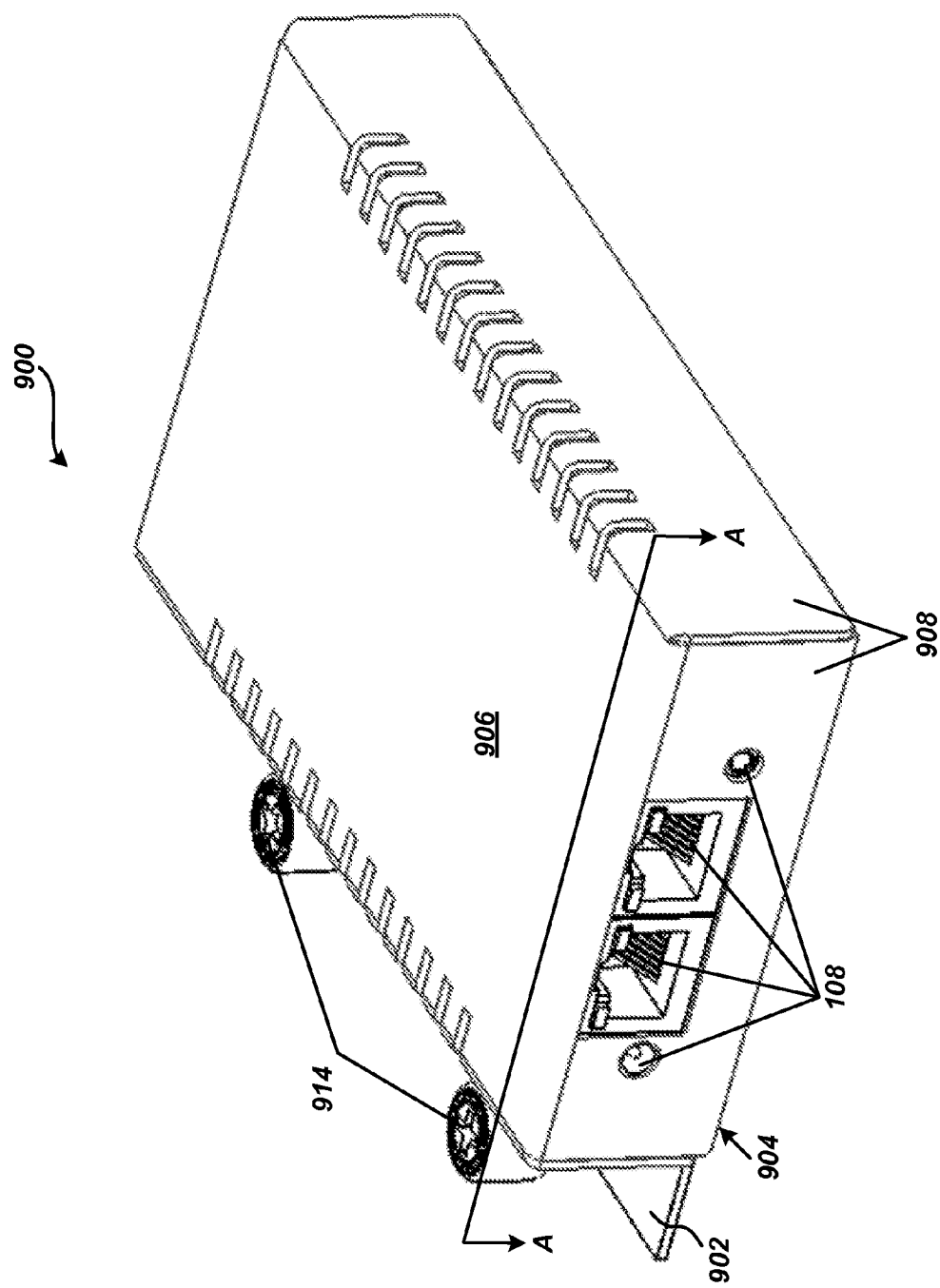
FIG. 10 is a top perspective view of an apparatus for providing supplemental functionality to a computer system when externally coupled to the computer system showing an assembled housing with accessible expansion card interfaces according to one embodiment described herein.
Figure 11:
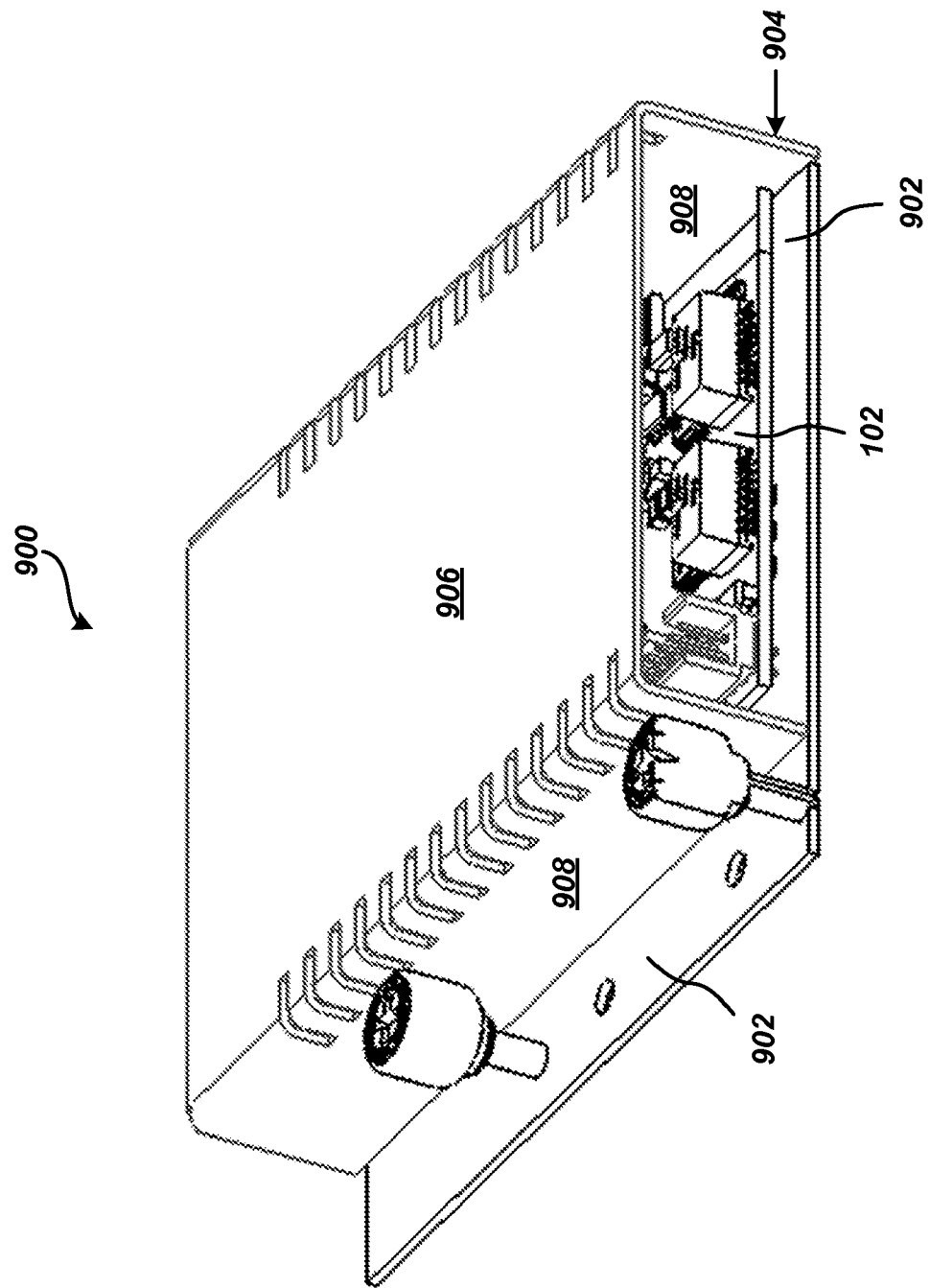
FIG. 11 is a top perspective cross-sectional view of an apparatus for providing supplemental functionality to a computer system when externally coupled to the computer system showing an expansion card mounted within an assembled housing according to one embodiment described herein.
Figure 12:
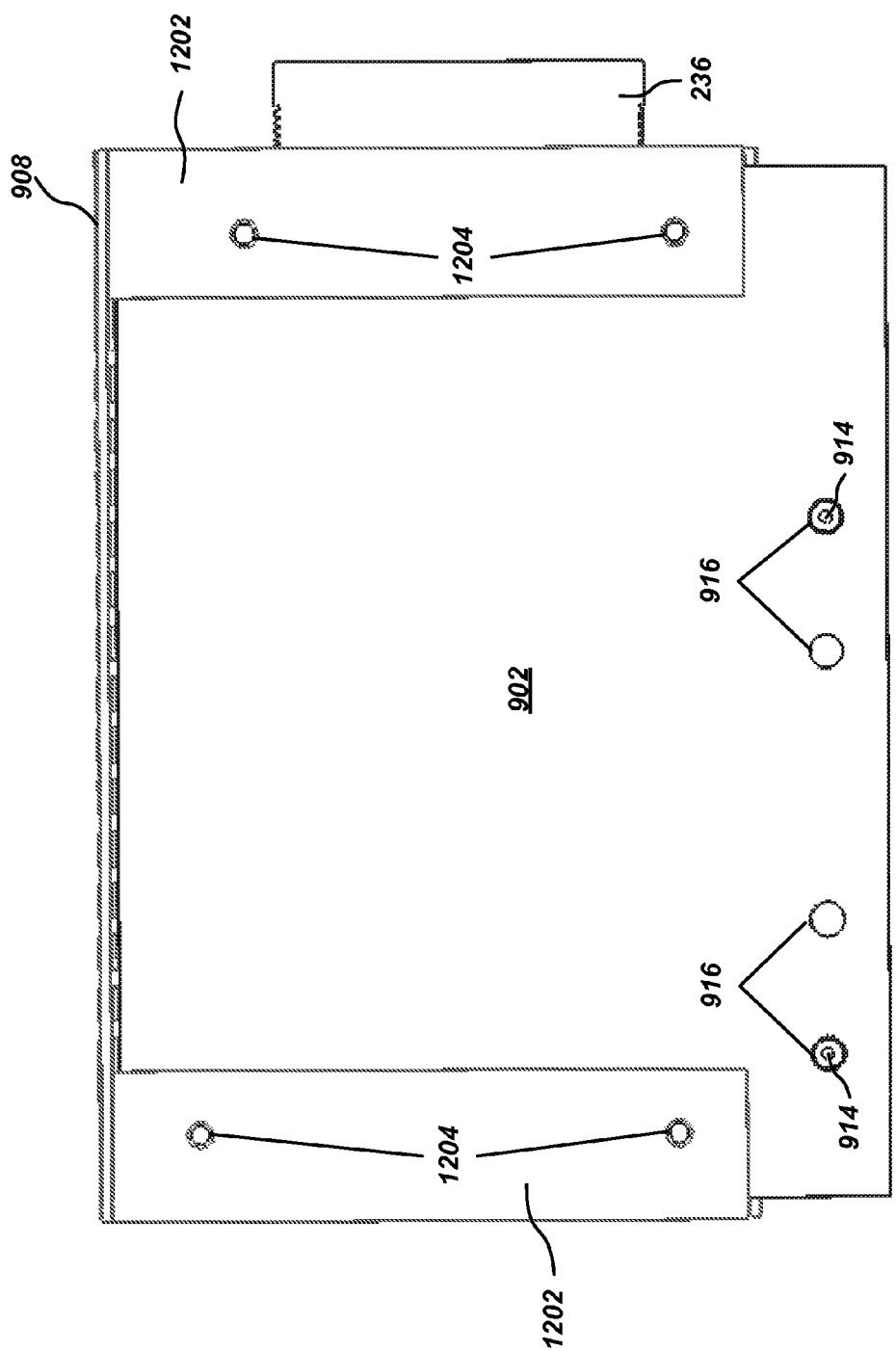
FIG. 12 is a bottom plan view of an apparatus for providing supplemental functionality to a computer system when externally coupled to the computer system showing a bottom plate and bottom tabs according to one embodiment described herein.
Figure 13:
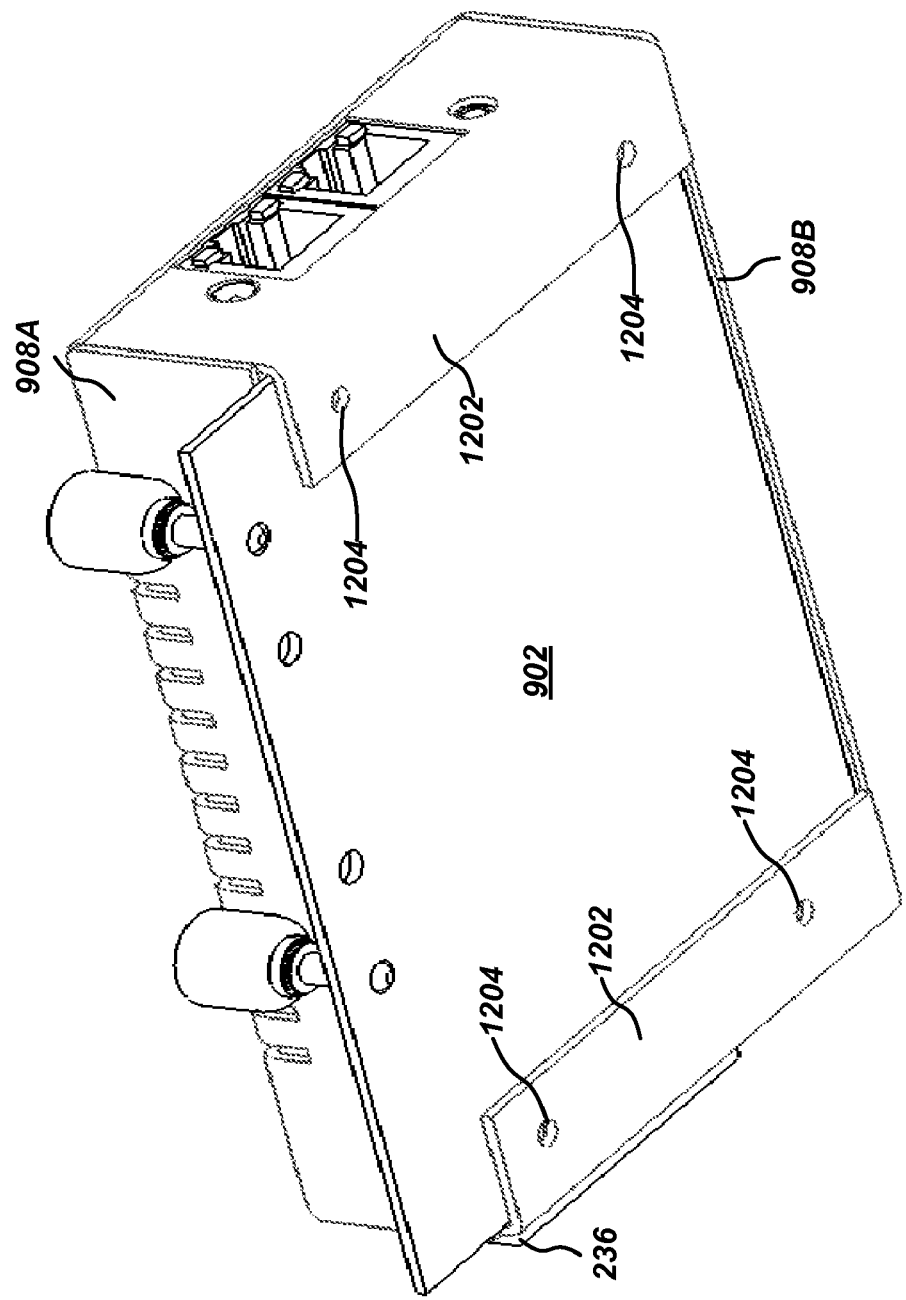
FIG. 13 is a bottom perspective view of an apparatus for providing supplemental functionality to a computer system when externally coupled to the computer system showing a bottom plate, captive thumbscrews for mounting the housing to a computer rack, and bottom tabs according to one embodiment described herein.

FIG. 10 shows an assembled peripheral expansion device 900. It can be seen that the bottom plate 902 extends past the case 904 to accommodate the thumbscrews 914. A cross-sectional view of the peripheral expansion device 900 along line A-A is shown in FIG. 11, where the circuit board 102 can be seen inside the housing 402. FIG. 12 shows the bottom of the peripheral expansion device 900. FIG. 13 shows a bottom perspective view of the peripheral expansion device 900. Looking at these two drawings, it can be seen that the bottom plate 902 slides between the lower edge of the vertical wall 908A and bottom tabs 1202. The bottom plate abuts vertical wall 908B. The bottom tabs 1202 have apertures 1204 that align with apertures 918 in the bottom plate. COMPACT FLASH card 236 on the circuit board 102 can be seen extending from one end of the housing 402. It should be noted that housing 402 may include any number of vertical walls 908 or apertures within vertical walls 908 in order to allow access to components on the circuit board 102.

Figure 14A:
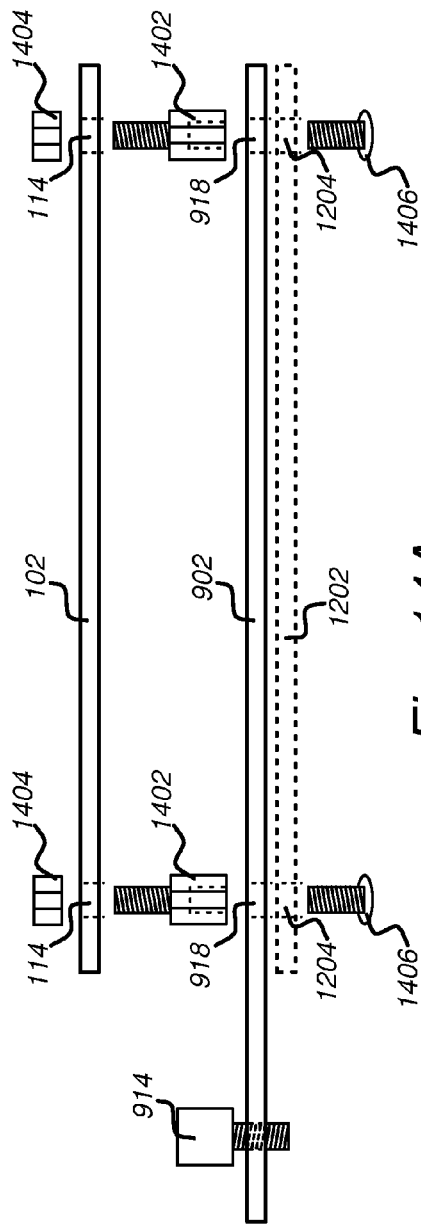
FIG. 14A is a partially exploded view of an expansion card and a bottom plate showing hardware for mounting the expansion card to the bottom plate according to one embodiment described herein.

FIG. 14A is a partially exploded view showing the circuit board 102, the bottom plate 902, and the mounting hardware 920 comprising hex standoffs 1402, nuts 1404, and threaded fasteners 1406. The hex standoffs 1402 are disposed between the bottom plate 902 and the circuit board 102, each with a threaded male end extending through apertures 114 in the circuit board 102. Nuts 1404 thread onto the male ends of the hex standoffs 1402 with the circuit board 102 disposed between, securing the hex standoffs to the circuit board. The heads of the hex standoffs 1402 have threaded female portions. Fasteners 1406 extend through apertures 1204 and 918 in the bottom tabs and the bottom plate respectively and screw into the threaded female portions of the hex standoffs 1402 with the bottom plate 902 disposed between, securing the bottom plate to the circuit board 102.

Figure 14B:
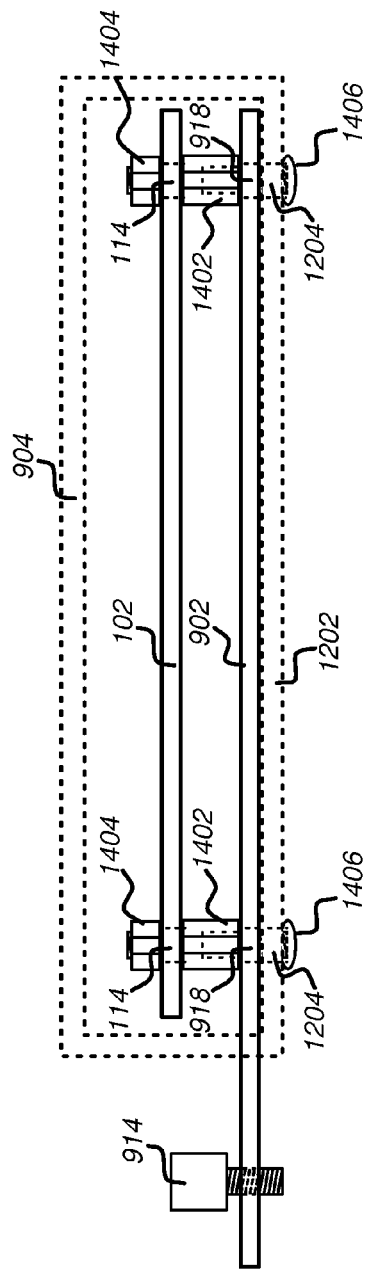
FIG. 14B is a side view of an expansion card mounted to a bottom plate showing mounting hardware according to one embodiment described herein.

The hex standoffs 1402 operate as spacers between the bottom plate 902 and the circuit board 102, allowing air to circulate around the circuit board and disperse the heat generated by the components mounted on the circuit board. FIG. 14B shows the assembled peripheral expansion device 900 with the circuit board 102 mounted to the bottom plate 902 within the case 904. It should be appreciated that any type of mounting hardware and methods may be used to secure the circuit board 102 within the housing 402. The circuit board 102 should be at least partially disposed within a protective housing. The exact structure of the housing and means for securing the circuit board 102 within the housing may vary without departing from the scope of the implementations described herein.

The implementations described herein provide a cost-effective solution for manufacturers that provide both internal and external versions of the same product. An expansion card may be marketed with a bracket, housing, and external power supply. The expansion card can then be used with the bracket to be internally coupled with a host computer or installed within the housing to be externally coupled to a host computer system. Having this flexibility allows a user of the product to configure the expansion card according to the requirements of a computer system and then reconfigure the expansion card should those requirements change.

It should be appreciated that embodiments described herein provide apparatus and systems for providing supplemental functionality to a computer system with an expansion card adaptable for both internal and external coupling to the computer system. Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. An apparatus for providing supplemental functionality to a computer system when internally coupled to the computer system and when externally coupled to the computer system, the apparatus comprising:
   an expansion card including an edge connector for receiving power from an internal power supply when the expansion card is internally coupled to the computer system, wherein the expansion card includes a power port for receiving power when the expansion card is externally coupled to the computer system;
   a further power supply for providing power to the power port when the expansion card is externally coupled to the computer system; and
   a housing configured to receive the expansion card when the expansion card is externally coupled to the computer system.

2. The apparatus of claim 1, further comprising a removable mounting bracket configured to secure the expansion card to the computer system when the expansion card is internally coupled to the computer system.

3. The apparatus of claim 1, wherein the housing comprises:
   a case having opposing vertical walls adjoining a top horizontal surface; and
   a bottom plate, wherein when the housing is assembled, the bottom plate being adjacent to the vertical walls opposite the top horizontal surface such that the expansion card is disposed in a space created between the top horizontal surface, the bottom plate, and the opposing vertical walls.

4. The apparatus of claim 3, wherein the housing further comprises at least one aperture in the case for connecting an external connector to a connector on the expansion card within the housing.

5. The apparatus of claim 3, wherein the housing further comprises means for securing the housing to a computer rack.

6. The apparatus of claim 5, wherein the means for securing the housing to the computer rack comprises at least one aperture in the bottom place configured for receiving a threaded fastener.

7. The apparatus of claim 3, wherein the case further comprises tabs adjacent to at least two opposing vertical walls for slidably receiving the bottom plate.

8. The apparatus of claim 3, wherein the housing further comprises a spacer for maintaining separation between the expansion card and the housing and a fastener for securing the expansion card within the housing.

9. The apparatus of claim 1, wherein the expansion card receives data from the computer system via the edge connector when the expansion card is internally coupled to the computer system and wherein the expansion card receives the data from the computer system via a separate data interface when the expansion card is externally coupled to the computer system.

10. A multi-mode apparatus for providing supplemental functionality to a computer system when internally coupled to the computer system and when externally coupled to the computer system, the apparatus comprising:
   an expansion card characterized by a first data interface for receiving data and power from the computer system when the expansion card is installed within the computer system and a second data interface for exchanging data with the computer system when the expansion card is disposed externally to the computer system;
   an external power supply;
   an expansion card edge connector for receiving power when the card is internally coupled to the computer system, wherein the first data interface comprises the expansion card edge connector; and a housing configured to receive the expansion card when the expansion card is externally disposed to the computer system.

11. The apparatus of claim 10, wherein the second data interface comprises one of a USB, an IEEE 1394, and a SCSI connector.

12. The apparatus of claim 10, further comprising a removable mounting bracket configured to secure the expansion card to the computer system when the expansion card is internally coupled to the computer system.

13. The apparatus of claim 10, wherein the housing comprises:
a case having opposing vertical walls adjoining a top horizontal surface; and
a bottom plate, wherein when the housing is assembled, the bottom plate being adjacent to the vertical walls opposite the top horizontal surface such that the expansion card is disposed in a space created between the top horizontal surface, the bottom plate, and the opposing vertical walls.

14. The apparatus of claim 13, wherein the housing further comprises a plurality of apertures in the bottom plate for receiving a threaded fastener for securing the housing to a computer rack and configured according to the EIA-310 specification for a standard computer rack mounting hole pattern.

15. The apparatus of claim 13, wherein the case further comprises tabs adjacent to at least two opposing vertical walls for slidably receiving the bottom plate.

16. The apparatus of claim 13, wherein the housing further comprises a spacer for maintaining a separation between the expansion card and the housing and a fastener for securing the expansion card within the housing.

* * * * *